United States Patent [19]
Laass

[11] 3,870,950
[45] Mar. 11, 1975

[54] OVERVOLTAGE PROTECTED, BATTERY POWERED ELECTRIC CIRCUIT TESTER

[75] Inventor: Heinz Laass, Hahn, Germany
[73] Assignee: Taco-Tafel GmbH Co., KG, Esslingen, Germany
[22] Filed: Dec. 17, 1973
[21] Appl. No.: 425,190

[30] Foreign Application Priority Data
Jan. 13, 1973  Germany............................ 2301742

[52] U.S. Cl..................... 324/51, 324/110, 324/133
[51] Int. Cl............................................... G01r 31/02
[58] Field of Search ....... 324/51, 53, 110, 132, 133; 317/16

[56] References Cited
UNITED STATES PATENTS

| | | | |
|---|---|---|---|
| 2,620,379 | 12/1952 | Zimmerman.......................... | 324/53 |
| 2,789,254 | 4/1957 | Bodle et al........................... | 324/110 |
| 3,343,085 | 9/1967 | Oushinsky............................ | 324/110 |
| 3,423,636 | 1/1969 | Rowley ................................ | 317/16 X |
| 3,493,815 | 2/1970 | Hurtle.................................. | 317/16 |
| 3,660,719 | 5/1972 | Grenier................................ | 317/16 |
| 3,676,739 | 7/1972 | Neuhouser.......................... | 324/51 X |

FOREIGN PATENTS OR APPLICATIONS
494,080  10/1938  Great Britain........................ 324/51
318,368  12/1929  Great Britain........................ 324/53

OTHER PUBLICATIONS
Todd, Carl David, A Sub-Ohm Continuity Tester, ELECTRONICS WORLD, Feb. 1969, pp. 78–80.

*Primary Examiner*—Gerard R. Strecker
*Attorney, Agent, or Firm*—Flynn & Frishauf

[57] ABSTRACT

To protect an electrical continuity tester, having an internal battery and adapted for connection to distribution power lines, against spurious voltages in the circuit to be tested, a positive temperature coefficient resistor is placed in series with a voltage-controllable semiconductor switch; an acoustic, or visual indicator is placed in series with the battery across the voltage-controllable semiconductor switch. The internal battery is of such value as to be below the triggering value of the semiconductor switch and, preferably, higher than the voltage drop across the semiconductor switch, when in breakdown condition. In case of extraneous voltages on the circuits to be tested, the semiconductor switch will break down, permitting self-limiting current flow through the PTC resistor, and bypassing high voltages from the self-contained battery and indicator.

7 Claims, 1 Drawing Figure

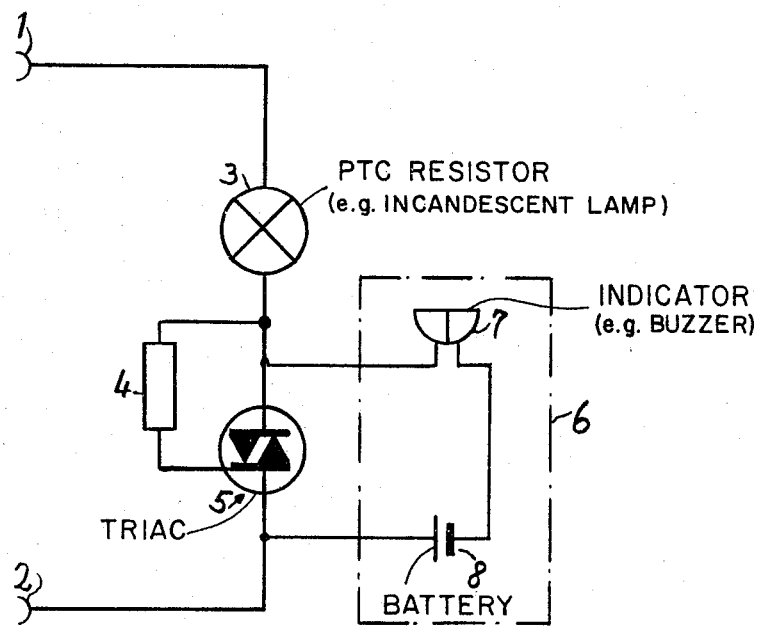

OVERVOLTAGE PROTECTED, BATTERY POWERED ELECTRIC CIRCUIT TESTER

The present invention relates to electrical circuit continuity testers and more particularly to test equipment which is designed to test industrial, commercial, or residential distribution wiring for continuity.

Electrical continuity testers are usually employed to test distribution wiring and distribution lines for continuity, that is, to determine if the resistance of a distribution network is below a certain value; usually, this value is in the order of a fraction or a few ohms, at the most. If the network, or line to be tested is continuous, the test instrument provides an optical or acoustic indication thereof. If the line has a high resistance splice therein, or is otherwise defective or discontinuous, thus exhibits a resistance which is greater than a permissible connecting resistance, the test instrument will so indicate, for example by absence of a visual, or audible indication. Such test instruments, usually of the ON-OFF type, thus may provide an output signal if, and only if the network, or current path under test does not have a resistance above a predetermined threshold value which, for a typical test instrument, may not be in excess of about 50 ohms.

The continuity testers, being designed for use with power lines, can be connected to line terminals which, due to inadvertent, or incorrect connections within the network, have line voltages applied thereto. Currently commercially available continuity testers are usually damaged by extraneous voltages in excess of already a fraction of line voltages. A typical damage threshold ratio is about 60 V. Resistors, transistors, and other elements within the continuity testers may be damaged. Usual distribution network voltages of, for example, 110 and 220 V frequently cause immediate destruction and burn-out of sensitive continuity testers.

Some continuity testers have been proposed and are commercially available and have been designed to be immune to extraneous network voltages. Such apparatus, heretofore, have not been very sensitive however and gave output signals indicative of continuity even if the line resistance of the network to be tested was as high as 1,000 ohms. Thus, the test for continuity was not reliable and poor splices would not be indicated thereby. Continuity of lines or networks which were designed for distribution voltage use could, therefore, be tested only approximately.

It is an object of the present invention to provide a continuity test apparatus which is sensitive and reliably distinguishes between a low resistance line to be tested and high resistance conditions in lines to be tested without, however, being damaged in case the line under test should have extraneous voltages appear thereon.

SUBJECT MATTER OF THE PRESENT INVENTION

Briefly, a positive temperature coefficient PTC resistor, such as a metal filament incandescent lamp, is connected in series with a voltage-controlled semiconductor switch, the series circuit being connectable across the line to be tested. A continuity series test circuit, formed of a voltage source and a current indicator is connected across the semiconductor switch. The voltage source has an output voltage which is below the breakdown voltage of the semiconductor switch. If the tester is connected across a line which does not have extraneous voltages applied thereto, and which is continuous, the voltage source — typically one, or a few flashlight batteries and providing between 1.5 and 12 V, will cause current flow through the indicator, through the PTC resistor, and through the — presumably continuous — test line. If the test line is continuous and of low resistance, the current indicator which is a buzzer, an indicator light, or the like, will provide an indication if the overall circuit resistance is below a predetermined threshold value, for example about 50 ohms. The total current flowing in the circuit is insufficient to cause heating of the PTC resistor which, therefore, will have a comparatively low resistance value. If the circuit is discontinuous, or has a high resistance, the current flow in the entire circuit will be insufficient to give an output indication.

Should, due to an error, malfunction, wrong connection, or for other causes, a voltage of, for example, 110, 220, or even more Volts be applied across the line terminals, then the line voltage will be applied across the voltage-controlled semiconductor switch which will break down, causing current flow through the circuit and an immediate reduction of the voltage across the semiconductor switch itself. Thus, excessive voltage is not applied across the continuity series circuit formed of the voltage source and the indicator; desirably, the voltage drop across the semiconductor switch, during the conduction thereof, is less than the voltage of the voltage source. Current flow through the semiconductor switch, due to external power supplied from the test line, will cause heating of the PTC resistor, so that the current through the semiconductor switch will be limited.

It has previously been proposed to provide continuity testers in which the input resistance thereto is raised to such a value that extraneous voltages, which may be expected (for example, if designed for domestic or commercial distribution, 110 or 220 V) cause only small values of current to flow through the tester itself. The voltage itself can be limited, within a certain portion of the tester, to predetermined values, for example by glow lamps, various other types of discharge lamps, Zener diodes, or the like. Such expedients, however, greatly increase the input resistance of the tester and decrease the sensitivity thereof, and do not permit direct testing for excessive connection resistances or to distinguish between high resistance and low resistance connected lines.

The invention will be described by way of example with reference to the accompanying drawing, wherein the single FIGURE illustrates a circuit for the voltage-protected continuity tester in accordance with the present invention.

The test terminals to which a sampling line is to be connected are shown at 1 and 2. The tester itself includes a connection from the test terminals 1, 2, formed of the series circuit of a positive temperature coefficient (PTC) resistance 3, typically a metal filament incandescent lamp, and a voltage-controlled switch 5, shown as a triac, the ignition electrode of which is connected over a resistor 4 to the opposite terminal of the triac, as shown. The indicator circuit 6 of the tester is connected across the main terminals of the triac 5. The test circuit is a series circuit which includes a voltage source, such as a flashlight battery 8, and a buzzer 7, or other suitable current indicators, such as an incandescent lamp, or other visual indicator. The voltage of the source 8 is selected to be below the triggering voltage of the triac 5; nor is the voltage of battery 8 sufficient to maintain the triac 5 in conductive condition after it has been triggered by an extraneous voltage pulse. The continuity testing circuit connected to a sampling line will, therefore, have the PTC resistor in series therewith. If the PTC resistor is a metal filament incandescent lamp, its cold resistance will be comparatively low and the lamp will not light, when energized merely by a flashlight cell 8. A typical PTC resistor would be a lamp which has a nominal voltage corresponding to the maximum voltage which could be expected in the circuit to be tested. Thus, upon connection of terminals 1, 2 to the terminals of a cable which, at its remote end, is short-circuited, will provide a continuity test for both conductors of a two-conductor cable.

Protective operation: If a cable to which the continuity test terminals 1, 2 are connected should have been energized by an extraneous source, for example have distribution voltage of 110 V applied thereto, triac 5 will fire. The voltage across the test circuit 6, formed by indicator 7 and voltage source 8, will then be limited to the voltage drop across the triac 5. The major extent of the foreign voltage will drop across the incandescent lamp 3 which will light, thus indicating to the operator that the line which he is attempting to test is "hot" and, additionally, limiting the current which will flow through the triac, as the lamp heats.

The circuit provides a reliable indication of low-resistance cables, by having an input resistance which is low, thus can be designed to provide output from the current indicator 7 if, and only if the connected cable or conductor is of low resistance. Yet, if the testing apparatus is connected to a conductor which should have an extraneous voltage applied thereto, the tester will remain undamaged.

The voltage-controlled semiconductor 5 may be any suitable semiconductor switch, which becomes conductive upon application of a voltage thereacross which is in excess of a certain threshold value. It may be a thyristor, SCR, transistor, a voltage-controlled diode, or other elements; it need not be bi-directionally conductive although, unless bi-directionally conductive, the use of the tester with direct current is then inadvisable since, if a voltage-controlled diode is used for element 5, lamp 3 will not light if the diode is reversely connected with respect to the polarity of the extraneous voltage source existing in the lines to be tested and connected to terminals 1, 2.

Various changes and modifications may be made within the scope of the inventive concept.

Further protection for the battery 8 and the indicator 7 may be obtained, for example, by placing a diode in the series continuity circuit formed of battery 8 and indicator 7, the diode being poled in forward direction to permit current flow from the battery 8 through the indicator 7 and through a closed circuit formed by PTC resistor 3 and continuous circuit connected to terminals 1 and 2. The voltage drop through this diode must be considered, however, when dimensioning the battery 8. Any reverse voltages applied to the battery 8, for example during conduction of the triac 5 can thereby be avoided.

I claim:

1. External Voltage protected electrical continuity tester to test the continuity of normally deenergized, connected electrical lines but which may have voltages applied thereto, said tester having a pair of input terminals (1, 2);

a protective circuit comprising a positive temperature coefficient (PTC) resistor (3) and a voltage-controllable semiconductor switch (5) connected in series to the PTC resistor (3) the free terminal of the PTC resistor, and of the switch (5) being connected to the respective tester input terminals (1, 2);

and a continuity checking circuit comprising a voltage source (8) and a current flow indicator (7) connected in series to the voltage source (8), the free terminal of the voltage source, and of the indicator being connected, respectively, across the semiconductor switch (5), the voltage source (8) having an output voltage which is below the breakdown voltage of the semiconductor switch to permit connection of the terminals (1, 2) to deenergized connected lines to be tested for continuity and provide a signal from the current indicator (7) due to current flow through the connected lines and the cold-resistance of the PTC resistor upon detection of continuity while, if the lines should be energized by a voltage normally destructive to the current indicator, the voltage-controlled semiconductor switch (5) will become conductive and permit current to flow through the PTC resistor which will self-limit the current upon heating thereof due to said current flow, the voltage drop across the semiconductor switch during conduction of the switch being less than the voltage which would damage at least one of: said voltage source (8); said current indicator (7).

2. Tester according to claim 1, wherein the semiconductor switch is a triac connected to be self-triggering.

3. Tester according to claim 1, wherein the PTC resistor comprises a metal filament incandescent lamp which, when the tester is connected to an energized circuit, will provide an indication of such energization, by becoming lit.

4. Tester according to claim 1, wherein the semiconductor switch comprises at least one of: thyristor, triac, transistor, or voltage-controlled diode.

5. Tester according to claim 1, wherein the semiconductor switch is of the type that its conduction is controlled by a voltage applied thereacross without separate energization from an external control source.

6. Tester according to claim 1, wherein the semiconductor switch is bi-polar.

7. Tester according to claim 1, wherein the voltage drop across the semiconductor switch is less than the voltage of said voltage source (8) comprised in the continuity checking circuit.

* * * * *